United States Patent [19]

Baker

[11] Patent Number: 4,458,823

[45] Date of Patent: Jul. 10, 1984

[54] FUEL CAP

[75] Inventor: Steven F. Baker, Bellevue, Ohio

[73] Assignee: General Motors Corporation, Detroit, Mich.

[21] Appl. No.: 503,822

[22] Filed: Jun. 13, 1983

[51] Int. Cl.³ ............................................. B65D 41/04
[52] U.S. Cl. .................................... 220/203; 220/288; 220/DIG. 33
[58] Field of Search ............... 220/203, 288, 361, 365, 220/854 R, 854 S, DIG. 32, DIG. 33

[56] References Cited

U.S. PATENT DOCUMENTS

| | | | |
|---|---|---|---|
| 4,079,855 | 3/1978 | Avrea | 220/361 X |
| 4,136,795 | 1/1979 | Crute et al. | 220/DIG. 32 X |
| 4,142,648 | 3/1979 | Johnson et al. | 220/203 |
| 4,228,915 | 10/1980 | Hooper | 220/288 |
| 4,252,246 | 2/1981 | Johnson et al. | 220/203 |
| 4,299,102 | 11/1981 | Aro | 220/203 X |

Primary Examiner—Steven M. Pollard
Attorney, Agent, or Firm—Donald F. Scherer

[57] ABSTRACT

A fuel cap has a cover-handgripping portion and a threaded closure portion, which portions are maintained in assembly by a ring member. The ring member has integrally molded therewith a plurality of outwardly extending flexible fingers in a hinged relationship. The closure portion is inserted in the ring member prior to assembly within the handgripping portion. At assembly, the fingers of the ring member pivot inwardly at the hinge position to become engaged with an annular groove formed in the handgripping portion. The movement of the fingers results in an inner portion of the ring member being displaced to form a support shelf for the threaded closure. Engagement of the fingers with the groove portion of the handgrip prevents removal of the ring and therefore the closure member from the handgripping portion.

1 Claim, 3 Drawing Figures

FUEL CAP

This invention relates to fuel caps and more particularly to fuel caps having interlocking members for maintaining the cap in the assembled condition.

Prior art devices, such as U.S. Pat. No. 4,252,246 issued Jan. 24, 1981, to Johnson et al. and assigned to the assignee of this invention, have intricately molded components which provide interlocking of the various members of the fuel cap. These assemblies require complicated mold structures or intricately designed mold cavities to provide the interlocking structures.

The present invention utilizes a ring member having a living hinge portion which permits the extension of finger members at assembly. These finger members engage a portion of the fuel cap to maintain the assembly intact. The finger members during this bending or flexing at assembly also create a shelf portion or support portion which positions and prevents the removal of the threaded portion of the fuel cap. The ring portion is a simple structure which permits the use of molds and cavities having substantially straight sided portions and do not require interlocking or intermeshing members in the die cavities.

It is therefore an object of this invention to provide an improved fuel cap assembly wherein the handgripping or cover portion and the threaded closure portion are maintained in assembly by a ring member having integrally molded fingers which engage the cover portion at assembly and prevent removal of the closure member therefrom.

It is another object of this invention to provide an improved fuel cap having a cover portion and a closure portion wherein these two portions are maintained in an assembly by a ring member having a plurality of flexible fingers which prior to assembly are extending outwardly from the ring member and at assembly are deflected inwardly to simultaneously engage a groove in the cover member and form a shelf or wall support for the closure portion, such that the engagement of the fingers with the cover prevents removal of the ring member and the support portion prevents removal of the closure.

These and other objects and advantages of the present invention will be more apparent from the following description and drawings in which.

Figure 1:
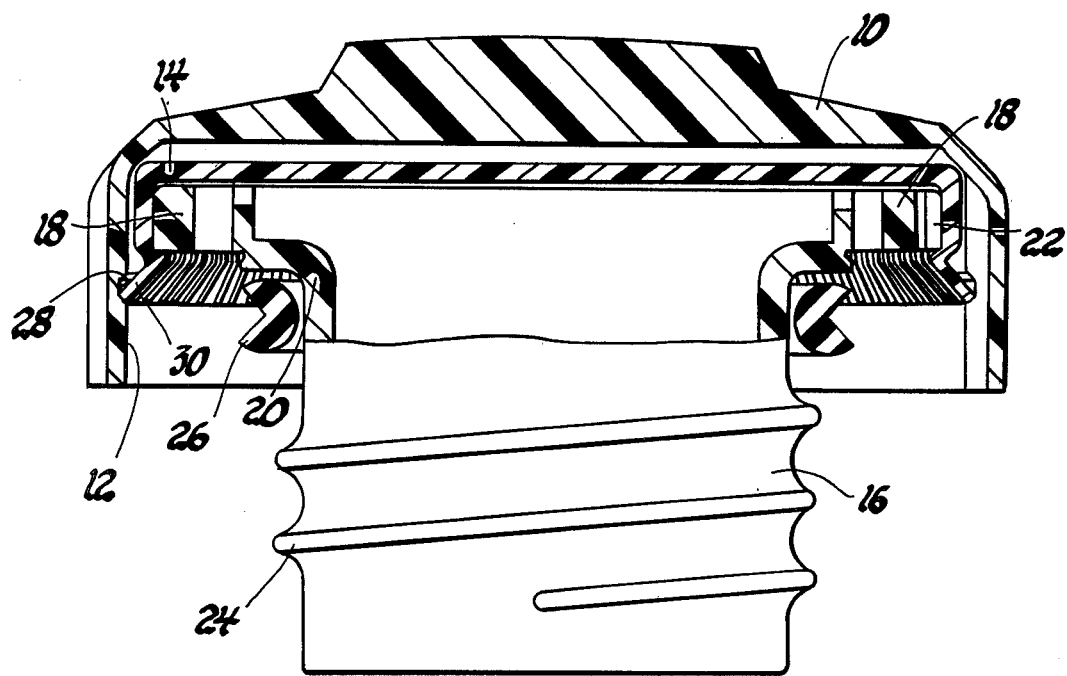
FIG. 1 is an elevational view partly in section of a fuel cap incorporating the present invention.

Referring to the drawings, wherein like characters represent the same or corresponding parts throughout the several views, there is seen in FIG. 1, a fuel cap having a handgripping cover portion 10. This cover portion 10 has a cylindrical inner surface 12 which houses a ring member 14 and a portion of a threaded closure member 16. The threaded closure member 16 has a plurality of torque arms 18 which extend radially outward from the main body 20. These torque arms 18 engage cam or ratchet portions 22 formed on the ring member 14. These torque arms and cam portions cooperate in a well-known manner to provide a torque limited drive. Such devices are conventional and a more detailed description is not considered necessary at this point. The threaded closure member 16 also has a thread portion 24 which is adapted to threadably engage a fuel fill tube, not shown, in a well-known manner. The threaded closure 16 has placed thereon a grooved O-ring seal 26 which is preferably constructed in accordance with the grooved O-ring shown in U.S. Pat. No. 4,065,026 issued Dec. 27, 1977, to Williams et al. and assigned to the assignee of this application.

Figure 2:
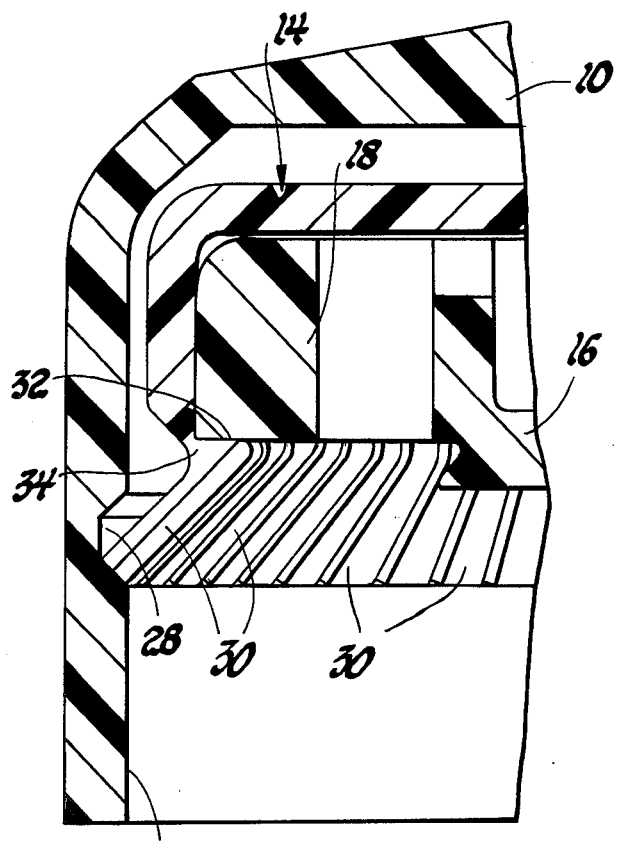
FIG. 2 is an enlarged sectional representation of a portion of the fuel cap.

As best seen in FIG. 2, the inner cylindrical surface 12 of cover 10 has formed therein an annular groove 28. Disposed within this annular groove 28 is a plurality of flexible finger members 30 which are formed integrally with the ring member 14. These finger members 30, in the position shown, form a shoulder or support shelf portion 32 which abuts the lower surface of torque arms 18.

It will be apparent from viewing FIG. 2 that attempted removal of the threaded portion 16 from the assembly is prevented by the shoulder portions 32 while attempted removal of the closure 16 and ring 14 will result in the flexible fingers 30 being deflected radially outward which is prevented by the groove 28 and therefore disassembly of the fuel cap is not possible without a special tool or considerable destruction to the fuel cap itself.

Figure 3:
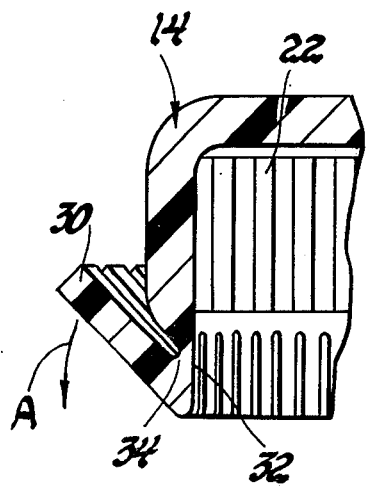
FIG. 3 depicts a portion of the fuel cap prior to fuel cap assembly.

As seen in FIG. 3, prior to assembly within the cover 10, the flexible fingers 30 extend outwardly and upwardly relative to the central body of the ring 14. In this preassembled condition, the shelves or support portions 32 are cylindrically formed about the inner periphery of the ring 14. It is during the assembly, of the ring 14 and threaded closure 16 into the cover portion 10, that the flexible fingers 30 are displaced in the path of Arrow A. During assembly, the shelf or shoulder portion 32 is moved from the circumferential position shown in FIG. 3 to the radial disposition which it has at complete assembly as seen in FIGS. 1 and 2.

The ring 14 can be made in a simple two piece mold which does not have any intricately formed chambers, interlocking pins or other members which must be retracted prior to the removal of the ring member from the mold. The ring member 14 can be formed simply by closing the two portions of the mold together and injecting the desired plastic material. Also, as seen in FIG. 3, there is a thin-walled portion 34. It is this thin-walled portion 34 that forms a hinge between the main body of ring 14 and the flexible fingers 30. This thin-walled hinge portion permits the easy flexibility of the fingers 30 such that the shelf member 32 can be formed at assembly.

It will become apparent from the foregoing that a very simple fuel cap assembly is attained. There is no need for metal working which must accompany some of the known cap assemblies when a metal handgripping portion is utilized. While the handgripping portion 10 is depicted as being a plastic member, it would be possible to use a metal cover, if desired. There would, however, be no need for coining or rolling the cover handgripping portion during the assembly of the fuel cap.

The embodiments of the invention in which an exclusive property or privilege is claimed are defined as follows:

1. An improvement in fuel caps having a cover portion and a closure portion retained in said cover portion, said improvement comprising; a ring member having a central cavity with an axially extending wall; a plurality of flexible fingers molded integrally with said wall and each connected thereto by a hinge portion, each said finger extending outwardly from said wall and having an inner surface coextensive with said wall, said closure being freely insertable in said ring prior to assembly in said cover; and said cover having a wall portion with an annular groove formed therein so that upon assembly of said ring member in said cover said fingers will be pivoted on said hinge portion by abutment with said wall portion to displace said inner surface to a position oblique to said wall portion of said cover to prevent removal of said closure and said fingers being engageable in said annular groove to prevent separation of said ring and said cover.

* * * * *